United States Patent [19]

Forford

[11] 4,237,512
[45] Dec. 2, 1980

[54] DIFFERENTIAL PROTECTION CIRCUITRY FOR ELECTRICAL DEVICES

[75] Inventor: Thorleif Forford, Vasteras, Sweden
[73] Assignee: ASEA Aktiebolag, Vasteras, Sweden
[21] Appl. No.: 958,481
[22] Filed: Nov. 7, 1978

[30] Foreign Application Priority Data
Nov. 11, 1977 [SE] Sweden .............................. 7712755

[51] Int. Cl.³ .............................................. H02H 3/32
[52] U.S. Cl. ........................................ 361/87; 361/63
[58] Field of Search .................. 361/87, 86, 82, 84, 361/36, 62, 63, 67

[56] References Cited
U.S. PATENT DOCUMENTS

| | | | |
|---|---|---|---|
| 2,608,606 | 8/1952 | Sonnemann | 361/63 |
| 3,337,772 | 8/1967 | Andersson | 361/36 |
| 3,573,552 | 4/1971 | Forford | 361/47 |
| 3,633,071 | 1/1972 | Fendt et al. | 361/63 |
| 3,974,423 | 8/1976 | Vlyanitsky et al. | 361/87 |

*Primary Examiner*—Patrick R. Salce

*Attorney, Agent, or Firm*—Watson, Cole, Grindle & Watson

[57] ABSTRACT

A differential protection circuit is responsive to measured current pulses generated upon the occurrence of external and internal faults within a protected device for emitting blocking and tripping signals respectively upon the occurrence of an external and an internal fault of the protective device. The measured current pulses are rectified and level-sensing means in a stabilizing circuit is responsive to the rectified current pulses. A stabilizing potentiometer is connected in series with the level-sensing means and a differential circuit is connected to the sliding terminal of the potentiometer. Both the stabilizing circuit and the differential circuit include gating means such that the emission of tripping signals is blocked upon the emission of output signals of the gating devices in the stabilizing circuit; and tripping signals are emitted upon the emission of output signals from the gating devices in the differential circuit. The differential protection circuitry may include fast-acting mechanical relays or electric logic circuitry.

11 Claims, 3 Drawing Figures

DIFFERENTIAL PROTECTION CIRCUITRY FOR ELECTRICAL DEVICES

BACKGROUND

1. Field of the Invention

The present invention relates to differential protection circuitry for electrical devices such as generators, busbars, line sections, etc.

2. Prior Art

Known percentage differential protection circuits may have certain difficulties in operating correctly when the characteristic of the current measuring transformers is poor, or when the current measuring transformers have difficulties in maintaining and delivering correct measurement values for a sufficiently long measuring time. In the known protecting circuits, an analogous comparison is made of the measuring quantities in the measuring circuit of the protection circuit corresponding to the primary quantities in the supervised device. Differences in properties of the current measuring transformers, therefore in some cases, make it difficult for the protection circuit to operate properly under all circumstances.

SUMMARY OF THE INVENTION

The protection circuit according to the present invention operates in such a way that the measuring signals from the current transformers actuate quick-acting level-sensing members provided with contact devices, in which the individual contacts always assume one of two possible positions. The measuring circuit requires no direct analogous relationship between the primary measured quantities and the signals in the measuring circuit. The essential factor is only that the measuring circuit receives a pulse of the correct polarity. The signal amplitude, as well as the accuracy in the transmission from the measuring transformers to the protection circuit are of lesser importance. The new protection circuit may therefore be said to be a digital protection circuit, although its level-sensing members may consist of mechanical relays.

BRIEF DESCRIPTION OF THE FIGURES

In the accompanying drawings.

DETAILED DESCRIPTION

Figure 1:
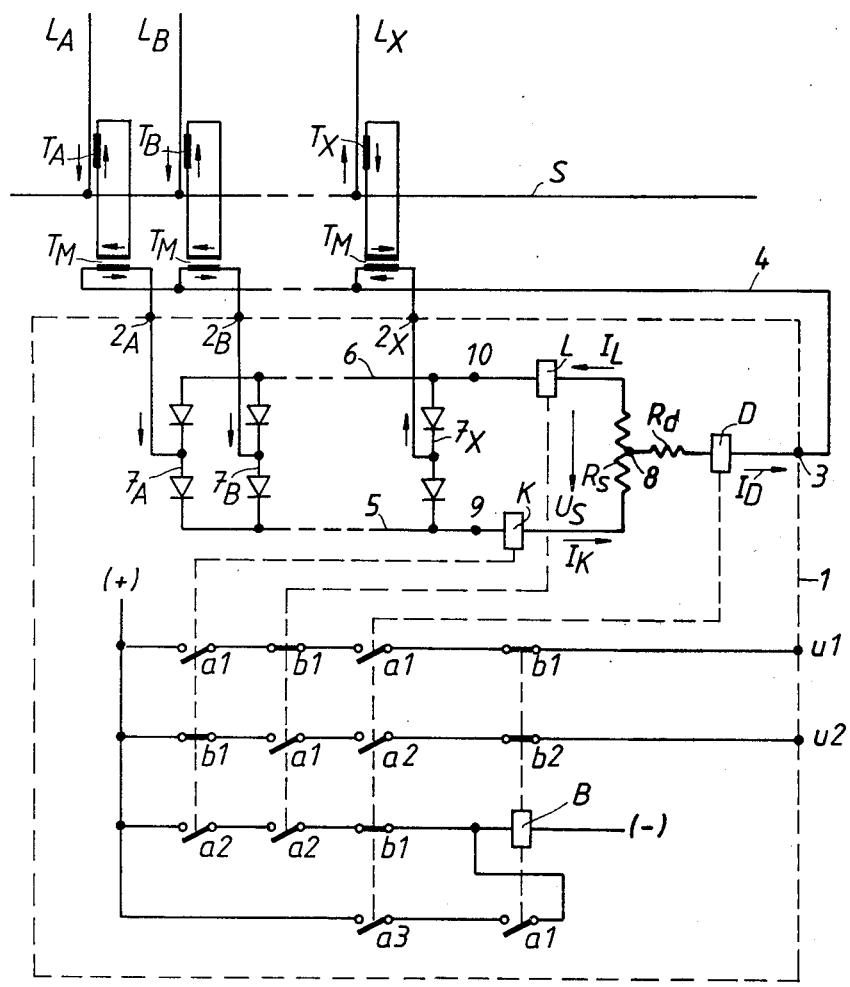
FIG. 1 shows a circuit diagram for a protection circuit according to the invention in which the protected object is a busbar and mechanical relays are used.

In the example of a possible embodiment of a differential protection circuit according to the invention shown in FIG. 1, busbar S is fed from a number of lines, designated LA and LB. The busbar feeds a line LX. The direction of current during a certain half-cycle is shown by the arrows. The lines are equipped in the known manner with current transformers $T_A, T_B \ldots T_X$, which are each connected through intermediate transformers $T_M$ to respective connection points $2_A, 2_B \ldots 2_X$ for measuring circuit 1. Measuring circuit 1 also has connection 3 for the common return conductor 4 of intermediate transformers $T_M$. Connection 3 is therefore the neutral point of the measuring circuit. Measuring circuit 1 has two parallel conductors 5 and 6, between which are diode chains $7_A, 7_B \ldots 7_X$ for each line to the busbar. Each of the diode chains has a midpoint connected to a corresponding connnection point $7_A, 7_B \ldots 7_X$ so that, for example, line LB has diode chain 7B connected to point 2B, etc. Conductors 5 and 6, respectively, are connected to each other at nodes 9 and 10, respectively, through relay K, potentiometer $R_s$ and second relay L. Relays K, L and potentiometer $R_s$ constitute the stabilizing circuit of the protection circuit, and when conditions are faultless a stabilizing voltage $U_s$ prevails across the resistance of potentiometer $R_s$. The midpont 8 of potentiometer $R_s$ is connected to neutral point 3 through resistor $R_d$ and relay D. Resistor $R_d$ and relay D comprise a differential and tripping circuit which also includes one of relays K and L plus half of the resistance of potentiometer $R_s$. Thus, the differential circuit consists of the components between nodes 9 and 3 during one half-cycle and the components between nodes 10 and 3 during the other half-cycle.

Each of the three relays K, L and D has a set of contacts with a number of contacts which may assume either an open or a closed position. The contacts which are open in an uninfluenced relay are designated a-contacts and those contacts which are closed in an uninfluenced relay are called b-contacts. The numeral after the letter refers to the order of the respective type of contact. The sets of contacts are shown at the bottom of FIG. 1. The uppermost row of contacts is connected to first tripping output U1, and the next lower row of contacts is connected to second tripping output U2. Outputs U1 and U2 may be interconnected. The third row of contacts is shown to include disconnecting relay B, the function of which will be described below. To differentiate the different contacts from each other, the relay designations K, L, D and B are prefixed to the contact designations in the following functional description.

The operation of the protection circuit in the event of an external fault is as follows: In the event of an external fault, the protection circuit does not trip since the fault lies, for example, in line LX and such a fault is to be acted upon by the line protection circuit. Relays K and L are adjusted in such a way that they are de-energized for a normal load. Thus, contacts Ka1 and La1 are opened and tripping outputs U1 and U2 are blocked. During the first milliseconds of the fault, the current transformer of line LX is not saturated. Currents $I_K$ and $I_L$ are then equal. Relays K and L are energized, but relay D remains de-energized, since no measuring differential current has started to flow. Contacts Ka1 and La1 are closed, but at the same time contacts Kb1 and Lb1 are opened. Further, contacts Ka2 and La2 are closed so that disconnecting relay B is energized, the contacts Bb1 and Bb2 thus opening and Ba1 closing.

After a short time, transformer $T_X$ becomes more or less saturated, which results in a differential current $I_D$ starting to flow and relay D being energized. Contacts Da1, Da2 and Da3 are then closed, whereas contact Db1 is opened. Disconnecting relay B is energized for holding, through contacts Da3 and Ba1. In the phase condition illustrated, current $I_L$ decreases to the same extent that $I_D$ increases, which may result in relay L being de-energized so that contact Lb1 is closed. However, because contact Bb1 of the disconnecting relay is opened, no tripping signal is emitted. During the second half-cycle the differential current flows through relay L, so that relay K can be de-energized if $I_K$ is low; or otherwise relay K may remain in an energized position. It does not matter which relay is energized, since contacts Bb1 and Bb2 are opened. Therefore, no tripping signal is produced at either of outputs U1 or U2. When the differential current flows in the direction of arrow $I_K$, the differential circuit consists of the circuit elements between nodes 9 and 3, whereas when the differential current flows in the direction of arrow $I_L$ during the second half-cycle, the differential circuit consists of the elements between nodes 3 and 10.

Relays K, L and D may be so adjusted to become energized as soon as they are traversed by a small overcurrent, for example $1.3 \cdot I_n$, where $I_n$ is the nominal rated current of the relays.

Relays K, L and D may be in the form of reed relays having a very short time of operation, about 1 ms. It may therefore be appropriate to design disconnecting relay B with a certain amount of releasing delay to make sure that it will remain energized and also mantain contacts Bb1 and Bb2 open if, when an external fault is in progress, the other contacts Ka1, Lb1, Da1 and Kb1, La1, Da2, respectively, should be closed for a brief period.

The operation of the protection circuit in the event of an internal fault is as follows: In the event of an internal fault on busbar S, incoming currents from lines LA and LB are obtained during the first half-cycle. If line LX is connected and conducts current, that current also flows towards busbar S. All measuring transformer currents flow towards node 9 and $I_K = I_D$. Relays K and D are energized, whereas relays L and B remain uninfluenced. A tripping signal appears at output U1. During the second half-cycle the differential current flows from node 3 to node 10, so that relays D and L are energized, whereas relay K remains uninfluenced so that contacts La1 and Da2 are closed, thus causing a tripping signal to appear at output U2.

Because of the quick operation of the relays, relays K, L and D return to their normal positions at the zero passage of the short-circuit current. In this manner the fact that an external fault may change into or cause an internal fault, can be accommodated as renewed measuring is started after each zero current passage.

Figure 2:
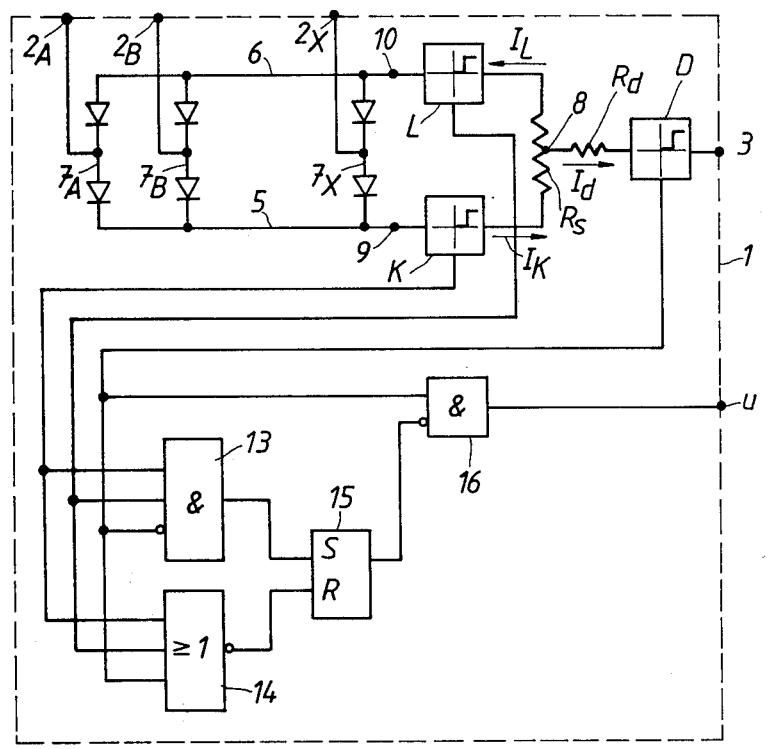
FIG. 2 shows a diagram of a protection circuit using electronic logic circuits.

FIG. 2 shows measuring circuit 1 designed with logic circuit components. Relays K, L and D in FIG. 1 are replaced in FIG. 2 by level-sensitive circuits with the same designation. Each of these circuits has an output connected to an input of AND gate 13 as well as OR gate 14 with a negated output. Level-sensitive circuit D is connected to a negated input of AND gate 13. Bistable flip-flop 15, with an S-input and an R-input, has the S-input connected to the output of AND gate 13 and the R-input connected to the output of OR gate 14. AND gate 16 has one input connected to the output of level-sensing circuit D, whereas its other input, which is negated, is connected to the output of flip-flop 15. The output of AND gate 16 is connected to tripping output U.

The operation of the protection circuit of FIG. 2 in the event of an external fault is as follows: When level-sensing circuits K and L, but not level-sensing circuit D, emit an output signal, AND gate 13 emits an output signal to flip-flop 15 which results in AND gate 16 being blocked so that it is unable to emit an output signal at tripping output U. When neither level-sensing circuit K, L nor D emits an output signal, OR gate 14 supplies a reset signal to flip-flop 15 at the R-input thereof. From the foregoing description it is clear that flip-flop 15 is reset at each zero passage of the primary current.

The operation of the protection circuit of FIG. 2 in the event of an internal fault is as follows: In the event of an internal fault, one of level-sensing circuits K and L must operate during the first and the second half-cycle, respectively, together with level-sensing circuit D. No output signal from AND gate 13 or flip-flop 15 can therefore appear. AND gate 16 therefore emits an output signal at tripping output U.

Since measuring takes place at each zero passage of the primary current, an internal fault caused by a previous external fault cannot cause a tripping signal after a time corresponding to—at the most—half a cycle of the primary current.

Figure 3:
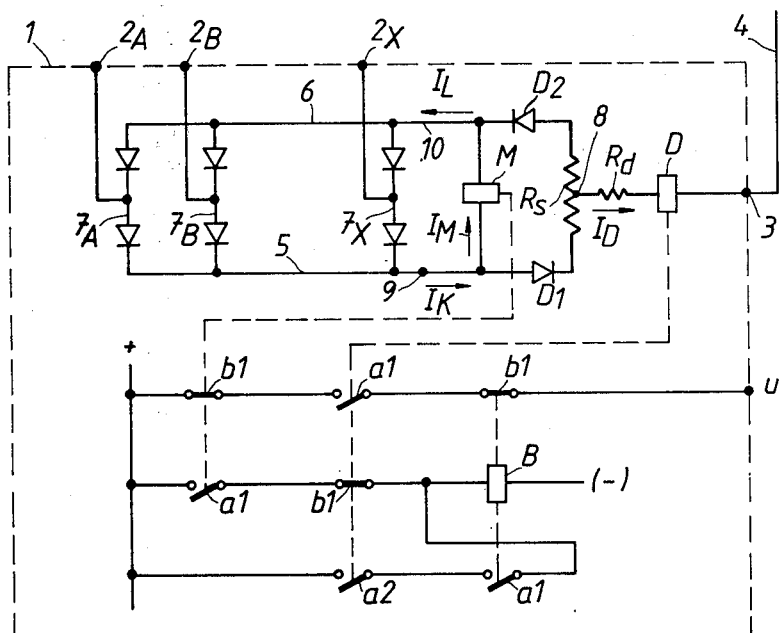
FIG. 3 shows a modified embodiment of the protection circuit according to FIG. 1.

A modified embodiment of the protection circuit according to FIG. 1 is shown in FIG. 3, wherein relays K and L have been replaced by one single relay M, which is positioned parallel to potentiometer $R_s$ by two diodes D1 and D2. The operational value for relay M can be selected to be approximately $1.3 \cdot I_n$, where $I_n$ is the nominal rated relay current. The functional value for relay D can be selected to be $0.2 \cdot I_n$.

The operation of the protection circuit of FIG. 3 in the event of an external fault is as follows: In the event of an external fault on line LX, a through current $I_K = I_M = I_L = I_X$ is obtained, whereas current $I_D = 0$ for as long as no current transformers have been saturated. During this time, relay M operates first and thereafter disconnecting relay B operates. After a short period, current transformer $T_X$ will possibly be saturated, whereby current $I_D$ starts increasing so that relay D operates. Disconnecting relay B is then energized for holding through contacts Da2 and Ba1. No tripping occurs since contact Bb1 is open.

The operation of the protection circuit of FIG. 3 in the event of an internal fault is as follows: In the event of an internal fault, current $I_K = I_D$ or current $I_D = I_L$. Relay D operates and closes contact Da1, so that a tripping impulse occurs at tripping output U. The functional value of the protection depends only on the setting of relay D.

A protection circuit according to FIG. 3 can thus be made more sensitive than the protection circuit according to FIG. 1. A requirement is, however, that for an external fault the current transformers $T_A, T_B \ldots T_X$ must be selected so that no saturation is obtained for fault currents below $1.3 \cdot I_n$.

What is claimed is:

1. Differential protection circuitry responsive to measured current pulses occurring upon external and internal faults of a protected device for emitting blocking and tripping signals, respectively, upon occurrence of an external and an internal fault of the protected device, the protection circuitry comprising:

a stabilizing circuit including means for rectifying said measured current pulses, first and second level-sensing means each being responsive to a respective different polarity output of said rectifying means, and a stabilizing potentiometer connected in series with said first and second level sensing means;

a differential circuit connected to the sliding terminal of said potentiometer for emitting tripping signals in conjunction with the operation of said stabilizing circuit; and blocking circuitry for blocking the emission of said tripping signals, and being responsive to the outputs of said first and second level-sensing means, said blocking circuitry being activated during a half cycle of said measured current pulses when overcurrent occurs in said stabilizing circuit before overcurrent occurs in said differential circuit and being reset when the currents through said two level-sensing means are below a predetermined level.

2. Differential protection circuitry as in claim 1 wherein said two level-sensing members and said differential circuit each comprise a relay having at least three relay contacts, said relay contacts being arranged in a three-by-three matrix with the contacts of each of said relays arranged in a respective column of said matrix and at least two rows of said matrix being connected in series to a tripping output terminal, the relay contacts of said differential relay being normally open in said first and second rows and closed in said third row, and the relay contacts of said first and second relays being normally alternately open and closed in the first two rows of said matrix and open in the third row thereof, and the rows of said matrix being connected to a power source.

3. Differential protection circuitry as in claim 2 wherein said blocking circuit includes a relay having a holding contact, and said differential relay includes an additional contact in said third row connected in series between said power source and said holding contact, said disconnecting relay including a normally closed contact in each of said first and second rows.

4. Differential protection circuitry as in claim 1 wherein said differential circuit includes a third level-sensing means and further comprising a first AND gate and an OR gate each having inputs connected to the output of each of the first, second and third level-sensing means, and a flip-flop circuit having respective set and reset inputs respectively connected to the output of said AND gate and said OR gate, a second AND gate having a first input connected to the output of said third level-sensing means and a second input connected to the output of said flip-flop circuit, the output of said second AND gate providing said tripping signals.

5. Differential protection circuitry responsive to measured current pulses occurring upon external and internal faults of a protected device for emitting blocking and tripping signals, respectively, upon occurrence of an external and an internal fault of the protected device, the protection circuitry comprising:
a stabilizing circuit including first means for rectifying said measured current pulses, a level-sensing circuit connected across said first means for rectifying, a stabilizing potentiometer, and second means for rectifying interconnecting each terminal of said level-sensing circuit to a respective terminal of said stabilizing potentiometer whereby each terminal of said stabilizing potentiometer is responsive to a respective polarity output of said first rectifying means;
a differential circuit connected to the sliding terminal of said stabilizing potentiometer for emitting tripping signals; and
blocking circuitry for blocking the emission of said tripping signals, and being responsive to the output of said level-sensing circuit, said blocking circuitry being activated during a half cycle of said measured current pulses when overcurrent occurs in said stabilizing circuit before overcurrent occurs in said differential circuit, and being reset when the current through said level-sensing means is below a predetermined level.

6. Differential protection circuitry as in claim 5 wherein said level-sensing circuit is a first relay, said differential circuit is a second relay, the relay contacts of said first relay and said second relay being connected in a two-by-two matrix with the contacts of each of said relays arranged in a respective column of said matrix and at least one row of said matrix being connected to a tripping output terminal, and the other row of said matrix being connected to said blocking circuit, said first row being connected to a power source, and the relay contacts of said first relay and said second relay being normally alternately open and closed in the first and second rows.

7. Differential protection circuitry as in claim 6 wherein said blocking circuit includes a relay having a holding contact and a contact connected in said first row in series with said tripping output terminal, and said second relay includes an additional contact connected in series with said holding contact and said power source and being normally open.

8. Differential protection circuitry for measuring current pulses resulting from external and internal faults of a protected device, comprising:
current transformers for measuring the current in the protected device;
a stabilizing circuit and a differential circuit connected to said current transformers for generating a tripping signal when the current in the differential circuit exceeds a predetermined value;
each said stabilizing circuit and said differential circuit including level-sensing means for determining when the respective currents in the stabilizing and differential circuits exceed respective predetermined levels;
blocking means connected to said level sensing means for blocking said tripping signal and being activated during a half cycle of the current when overcurrent occurs in the stabilizing circuit before the occurrence of overcurrent in the differential circuit, and said blocking devices being adapted to be reset when the currents through said level-sensing devices in the stabilizing and differential circuits fall below said predetermined levels.

9. Protection circuitry as in claim 8 further comprising two separate conductors connected to said stabilizing circuit and said differential circuit and rectifying means interconnecting each said current measuring transformer and each of said two conductors, said stabilizing circuit including said level-sensing means in each of said two conductors.

10. Protection circuitry as in claim 8 further comprising two separate conductors connected to said stabilizing circuit and said differential circuit, and rectifying means interconnecting each said current measuring transformer and each of said two conductors, a resistance interconnecting said two conductors, said level-sensing means in said stabilizing circuit being connected between said two conductors.

11. Protection circuitry as in claim 8 wherein said blocking means includes bi-stable flip-flop means responsive to the output of said level-sensing means and a gating means responsive to the output of said bi-stable flip-flop means to be set in a blocking condition if overcurrent in said stabilizing current occurs before overcurrent in said differential circuit.

* * * * *